Figure 1:
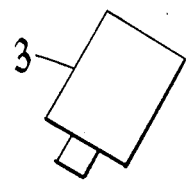
Figure 1:
Figure 1:
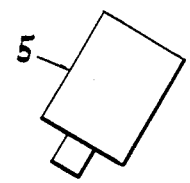
Figure 1:
Figure 1:
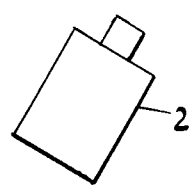
Figure 1:
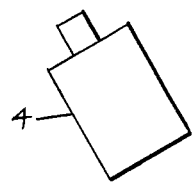

United States Patent [19]

Anthony

[11] Patent Number: 4,707,091

[45] Date of Patent: * Nov. 17, 1987

[54] ULTRAVIOLET METHOD FOR MAKING OPTICAL COMPOSITES

[76] Inventor: Dennis R. Anthony, 3119 Kelton Ave., Los Angeles, Calif. 90034

[*] Notice: The portion of the term of this patent subsequent to Jan. 17, 2004 has been disclaimed.

[21] Appl. No.: 647,681

[22] Filed: Sep. 6, 1984

[51] Int. Cl.⁴ .......................... G03B 19/18; A63J 5/00
[52] U.S. Cl. ....................................... 352/47; 352/45; 352/46; 352/89
[58] Field of Search ......................... 352/45, 46, 47, 89

[56] References Cited

U.S. PATENT DOCUMENTS 3,149,969  9/1964  Vlahos .................................. 352/45

Primary Examiner—Monroe H. Hayes

[57] ABSTRACT

The invention provides a method of- using the fundamental property of semiconductors to combine two or more photographic images into a single photographic image, the method involving the use of ultraviolet light to cause areas of a transparent semiconductor to become reflective and opaque so that portions of a projected background image can't pass through those parts of the semiconductor while portions of an appropriate foreground image reflect from them, thereby creating a composite image.

2 Claims, 2 Drawing Figures

ULTRAVIOLET METHOD FOR MAKING OPTICAL COMPOSITES

The invention provides a method of using the fundamental property of semiconductors to combine two or more photographic images into a single photographic image, the method involving the use of ultraviolet light to cause areas of a transparent semiconductor to become reflective and opaque so that portions of a projected background image can't pass through those parts of the semiconductor while portions of an appropriate foreground image reflect from them, thereby creating a composite image.

BRIEF DESCRIPTION OF THE PRIOR ART

In the prior art optical composites for motion pictures in which all elements of the composite display movement are made by one of four methods; "process" photography, optical printing with travelling mattes, front-projection matting, and the fleximatte process.

In its original form process photography is carried out by placing the object whose image is to be inserted into a background image in front of a semitransparent screen, projecting the background image onto the screen from the rear (hence the denotation "rear-projection photography"), and photographing the result. A more recently invented alternative is "front-projection photography", in which the desired foreground object is placed in front of a highly reflective screen and photographed while the background image is projected onto it and the screen by a projector whose optical axis is united in a beam splitter with the camera's optical axis: so uniting the optical axes of the camera and projector ensures that the shadow the object casts on the screen will not be visible to the camera and using a screen made of material that reflects most of the light striking it back toward its source ensures that the part of the background image reflected from the foreground object is substantially dimmer than the light that must be reflected from the object to make it appear bright enough to the camera to match the background image visible on the screen.

Optical printing with travelling mattes, exemplified by the well-known "blue-screen process", consists of using an optical printer, essentially a projector focussed directly into a camera, to rephotograph the image of the background while the film on which that image is recorded is bipacked with a travelling matte of the foreground object, rewinding the fresh film in the camera, then rephotographing onto that same film the image of the foreground object while the film on which that image is recorded is bipacked, if necessary, with a negative travelling matte of the foreground object. The blue-screen process takes its name from the fact that the foreground object must be photographed against a featureless aquamarine-blue screen so that a travelling matte, an opaque silhouette of the object on otherwise clear film, can be generated from the developed color film carrying the image of the object.

Front-projection matting, which was invented by the present petitioner (U.S. Pat. No. 4,406,529), consists of replacing an optical printer's camera with a front-projection apparatus, bipacking the film carrying the foreground image with a corresponding frontprojection matte into the optical printer's projector (from which the lenses have been removed), and photographing the bipack while front projecting the background image onto it. The front-projection matte for this process is made by preparing two negative travelling mattes of the foreground object on black-and-white film, bleaching one of them in a solution of mercuric chloride, and then bipacking the two negative mattes, the unbleached matte being necessary to prevent the image of the background against which the foreground object was originally photographed from showing through the now-translucent bleached matte.

The fleximatte process, which was also invented by the present petitioner (App. Ser.No. 06/439,307 filed 1983 Jan. 21), consists of front projecting and photographing the negative image of a background on a semitransparent screen while simultaneously projecting a slightly overilluminated negative matte of the foreground object onto the screen from the rear, developing the film in the camera into a positive print of the background with the desired positive matte of the foreground object "burned" in, and then front projecting and photographing that pre-matted background image on the screen while simultaneously projecting the image of the foreground object onto the screen from the rear. If the apparatus used to carry out the fleximatte process is moved by a computer-guided motion control system to ensure repeatability of its movements, it can impose substantial changes in the size, orientation, and position of the foreground object's image in the background frame relative to the size, orientation, and position of the foreground object's image in the frame into which it was originally photographed.

SUMMARY OF THE INVENTION

The present invention provides an alternative to the above-described techniques, an alternative that expands the array of tools available to the motion picture special-effects artist in his quest to creat images of things that do not exist. In principle, it is related to the fleximatte process, constituting a single-stage version of it.

The characteristic property of semiconductors, which the invention exploits, is their strange indecision over their electrical identity. A semiconductor can be regarded as a kind of atomic flypaper with its conduction electrons sticking to its crystalline lattice until kicked free by a per electron donation of energy equal to or greater than the semiconductor's characteristic band-gap energy. Thus, a semiconductor material such as zinc sulfide, which has the transparency of an electrical insulator because the photon energies of visible light are inadequate to kick its conduction electrons free of its lattice, takes on the electrical conductivity and, hence, the reflectivity and opacity of a metal when and where it is struck by ultraviolet light from a mercury-vapor lamp.

According to the present invention a method of combining two or more separate images into an optical composite comprises focussing onto a transparent or translucent semiconductor screen with ultraviolet light a silhouette of each of the foreground images to be optically inserted into a background, focussing onto each silhouette with visible light projected from the front of the screen that silhouette's corresponding foreground image, focussing onto the screen from the rear with visible light the desired background image, and photographing the result from the front of the screen.

THE PREFERRED EMBODIMENTS

Figure 2:
Figure 2:
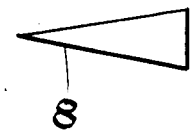
Figure 2:
Figure 2:
Figure 2:
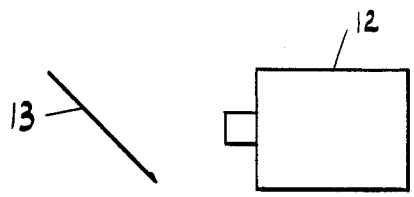
Figure 2:
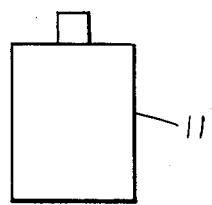

I will now describe the preferred embodiments of my invention in appropriate detail with reference to the accompanying drawings, in which:

FIG. 1 is a diagrammatic plan view of an apparatus suitable to carry out the method of the invention, and FIG. 2 is a diagrammatic plan view of an apparatus suitable to carry out an alternative method of the invention.

In the embodiment of FIG. 1 of the drawings an apparatus suitable for carrying out an ultraviolet method of making optical composites comprises a translucent or transparent screen 1 that includes a suitable semiconductor material, a camera 2, a background projector 3, and a foreground projection system that comprises a visible-light projector 4 and an ultraviolet-light projector 5 whose optical axes are united in a beam splitter 6.

The method of the invention is carried out in the following way: The film carrying the foreground object's image is bipacked with its negative matte is loaded into the visible-light projector 4 and a copy of the negative matte, a transparent silhouette of the foreground object an otherwise opaque film, is loaded into the ultraviolet-light projector 5. The film carrying the background image is loaded into the projector 3 and fresh film is loaded into the camera 2. The three projectors, synchronized with the camera, project their contained imagery onto the screen 1 and the camera photographes the result, a composite image depicting the foreground object in the background image.

In the embodiment of FIG. 2 of the drawings an apparatus suitable for carrying out a variant ultraviolet method for making optical composites comprises an ultraviolet-emitting screen 7 in front of which a foreground object 8 is placed, a lens 9, a transparent semiconductor plate 10, and a front-projection apparatus that comprises a camera 11 and a visible-light projector 12 whose optical axes are united in a beam splitter 13. The lens 9 is so positioned in the apparatus that it will focus onto the plate 10 the visible and ultraviolet light emanating respectively from the foreground object 8 and from the screen 7 and the camera 11 and the projector 12 are both focussed on the plate 10.

The method of the invention is carried out in the following way: A film carrying a suitable background image is loaded into the projector 12, the object 8 is illuminated with stage lighting, the screen 7 is made to emit ultraviolet light, and the camera 11 photographs the object 8 while the projector 12 projects its contained imagery onto the plate 10.

In this variant of the method focussing the image of the foreground object and its ultraviolet background onto a transparent semiconductor plate creates an aerial image of the object in a transparent region of the plate surrounded by reflective areas. Thus, when an appropriate background image is focussed onto the plate from the front that image will be reflected back to the camera only from those areas of the plate not containing any part of the foreground object's image, those parts of the background image falling on areas of the plate occupied by the foreground image passing through the there-transparent plate to be lost. Thus, the camera can photograph a proper composite image in which no part of the background appears visible through the foreground object in the manner of a double exposure.

In accordance with the foregoing specification and its accompanying drawings, I claim as my invention:

1. A method of combining two or more separate images into an optical composite, which method comprises projecting onto a screen that contains transparent or translucent semiconductor material, with ultraviolet light whose photon energy exceeds the band-gap energy of the semiconductor material, a silhouette of each of the foreground images to be inserted into a background image; projecting onto the said screen from the front each of the appropriate foreground images such that each image appears on the screen congruent with its ultraviolet silhouette; projecting onto the screen from the rear the appropriate background image; and photographing the result from the front of the screen.

2. A method of combining a foreground image or images and a background image into an optical composite, which method comprises projecting onto a transparent semiconductor plate from the rear the appropriate foreground images; projecting onto the said plate a uniform field of ultraviolet light whose photon energy exceeds the band-gap energy of the semiconductor material, the said field being prevented by mattes or by the foreground objects themselves from illuminating those parts of the plate occupied by the foreground images; projecting onto the plate from the front the appropriate background image; and photographing the result from the front of the plate.

* * * * *